METHOD AND APPARATUS FOR MICROWAVE RADAR SIGNAL RECEIVING, RECORDING AND RETRANSMISSION
Original Filed March 14, 1961 2 Sheets-Sheet 1

INVENTORS
Harold C. Anderson
Kenneth E. Peltzer,
BY Alfred B. Levine
ATTORNEYS

METHOD AND APPARATUS FOR MICROWAVE RADAR SIGNAL RECEIVING, RECORDING AND RETRANSMISSION

Original Filed March 14, 1961 2 Sheets-Sheet 2

INVENTORS
Harold C. Anderson
Kenneth E. Peltzer,
BY Alfred B. Levine
ATTORNEYS 3,345,620
Patented Oct. 3, 1967

3,345,620

METHOD AND APPARATUS FOR MICROWAVE RADAR SIGNAL RECEIVING, RECORDING AND RETRANSMISSION

Harold C. Anderson, Rockville, and Kenneth E. Peltzer, Seabrook, Md., assignors to Litton Systems, Inc., College Park, Md.

Continuation of application Ser. No. 95,531, Mar. 14, 1961. This application Sept. 3, 1963, Ser. No. 306,061
15 Claims. (Cl. 340—173)

This application is a continuation of application Ser. No. 95,531, filed Mar. 14, 1961, and now abandoned.

This invention generally relates to the detection and reproduction of radiant microwave beams by means of a system and process involving subatomic resonance phenomena, and to a novel microwave frequency filter for use in the system and elsewhere. Among the many applications of the present invention are those including the direction and reproduction of microwave radar beams, although as will be appreciated by those skilled in the art, this invention and its various modifications may be employed for many other communication and control functions.

Very generally, the present invention is concerned with directly recording and directly reproducing radiant radio beams in the microwave bandwidths of frequencies by the technique of forming spectral frequency images of the radiant beam on a moving record member and reconverting the image into radiant beam form after a delayed time interval. This invention differs from applicants' copending applications Ser. No. 73,695, filed Dec. 5, 1960, now Patent No. 3,243,784, and Ser. No. 73,696, filed Dec. 5, 1960, now Patent No. 3,137,003, by providing more comprehensive systems and processes of this type to provide adjustable variations in the time delays between the recording and reproducing functions and to permit controlled variations in the time duration of reproducing the recorded beam, both of these features being desired for numerous communication and control functions.

In addition, the present invention is concerned with further extensions of these techniques for recording and reproducing lower frequency radio beams that are not normally within the recording frequency bandwidth of the system and process.

Among the other features of the invention is the provision of additional controls in the system and process for enabling both continuous wave radio beams and intermittent pulse beams to be recorded and reproduced and to permit the time sampling of continuous wave beams.

To provide these functions, the invention very generally employs a specially prepared microwave beam sensitive recording tape that responds directly to a radiant beam to absorb energy from the beam and effect a recording thereof. A nonlinear static magnetic field of high intensity is applied to an extended surface region over the tape which renders different positions across the surface selectively sensitive to different component frequencies of the beam. In this manner, an illuminating microwave beam directly applied to the tape is converted and recorded thereon in the form of a spectral frequency image. Due to the nature of the recording phenomena involved, the microwave sensitivity of the tape is destroyed at each region where a frequency component has been previously recorded. Consequently, the recorded image functions as a microwave beam transparency and during playback, when the image is illuminated by a complete spectrum of readout frequencies, it transmits or passes only those frequency components that were present in the original beam. For controlling the delay time before reproducing the spectral image back into a time variable beam, there is provided means for adjusting the distance or spacing between the recording and playback operations together with means functioning to continously drive the tape between these positions thereby to shorten or lengthen the time delay between recording and reproduction of the beam. For controlling the time duration of reproducing the beam, there is provided a further adjustment permitting the recorded image to be illuminated by the playback radiant beam for a longer or shorter time duration. In this manner the beam may be correspondingly reproduced for a shorter or longer time interval.

To provide the additional function of permitting the recording and delayed playback of lower frequency radio beams, below the normal functioning bandwidth of the system and process, there is provided the additional steps of increasing the frequency of the beam by a constant amount before applying the beam for recording, and after reproduction of this synthetic beam image, decreasing the frequency by the same amount as during recording thereof, whereby the resulting lower frequency beam obtained is a substantially identical reproduction of the original beam.

It is accordingly a principal object of the invention to provide a microwave process and system for receiving and reproducing a time variable microwave radiant beam having unknown frequency components lying within a broad frequency spectrum.

A further object is to provide such a process and system having a controllably variable time delay between reception of the beam and reproduction thereof.

Another object of the invention is to provide such a process and system having a controllably variable time duration for reproduction of the radiant beam.

Still another object is to provide such a system and process wherein many different microwave frequency components may be simultaneously received and simultaneously reproduced.

A very general object of the invention is to provide such a system and process for directly converting time variable radiant microwave beams having different component frequencies into a series of frequency spectrum images and reconverting the images back into a time variable beam at the same or at a different power than the incoming beam.

Another object is to perform such a conversion with variable time delay between the reception of the beam and transmission of its reproduction.

A still further object is to provide such a process and system for recording and reproducing lower frequency radio beams, normally residing outside of the frequency bandwidth thereof.

Other objects and many additional advantages will be more readily understood by those skilled in the art after a detailed consideration of the following specification taken with the accompanying drawings, wherein.

Figure 1:
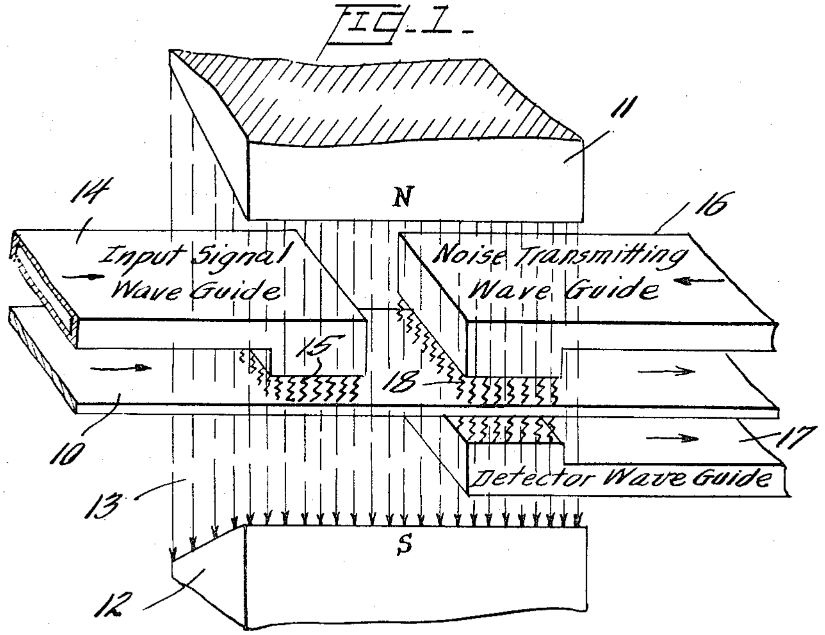
FIG. 1 is a perspective view illustrating one preferred recording and reproducing process according to the present invention.
Figures 2, 3:
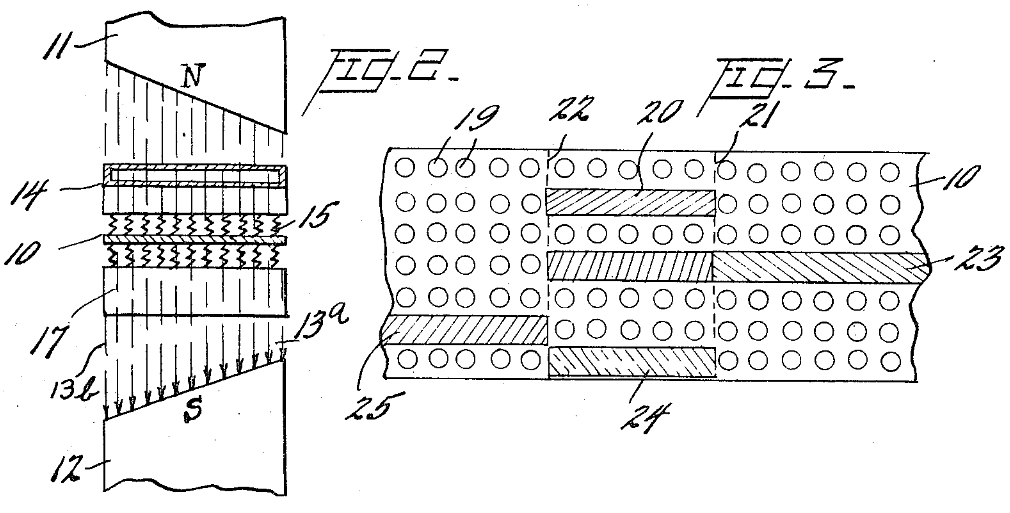
FIG. 2 is a cross-sectional view of FIG. 1 as viewed from the left-hand side thereof.
FIG. 3 is a schematic illustration of one form of a recording tape having a series of microwave images recorded thereon according to the present invention.

Referring now to the drawings, there is schematically shown in FIGS. 1 to 3, one means for directly converting a time variable radiant microwave beam 15 into a series of spectral images on a moving tape 10 together with means for directly reconverting the images back into time variable radiant beams for delayed retransmission.

As is generally shown, the incoming radiant microwave beam 15 is conveyed through an input signal waveguide 14 into the recording zone wherein the moving record member or tape 10 passes closely beneath the open end of the wave guide 14. The incoming microwave beam 15, therefore, uniformly illuminates a wide surface area on the tape 10 forming one frame or image region as best shown in FIG. 2. Within this recording zone, the tape 10 is subjected to a high intensity static magnetic field 13 that is nonuniform in intensity in a manner progressively varying across the tape, thereby to provide the highest intensity magnetic flux 13*a* at the right-hand edge region of the frame and a progressively lower intensity magnetic flux across the tape to the left-hand flux regions and providing the lowest intensity flux 13*b* at the left-hand edge of the frame. Thus, within this recording zone an image region or frame on the tape 10 is simultaneously exposed to a nonuniform high intensity static magnetic field 13 and is uniformly illuminated directly by the radiated microwave beam 15.

The tape 10 is provided with a microwave resonant material thereon or therein in the form of a layer, coating or impregnation of a suitable material that will selectively absorb energy from the microwave beam 15 at different frequencies depending upon the strength or intensity of the magnetic field energizing the material. Thus, by providing the nonuniform magnetic field 13 transversely across the tape, each adjoining transverse region in the frame that is exposed to the radiant beam 15 is presensitized to respond to a different frequency component in the microwave beam 15 and will absorb energy from the beam 15 only if the beam 15 contains that particular component of frequency. Consequently, if the beam 15 contains a number of frequency components, each component thereof is selectively absorbed and recorded at a different position transversely across the frame to provide a spectral frequency recording of the radiated beam 15. According to the invention, the tape 10 is continuously passed through the recording zone and continuously illuminated by the microwave beam 15, thereby to provide a series of such spectral images of the beam 15 along the length of the tape 10.

FIG. 3 generally illustrates a portion of the tape 10 having three side-by-side spectral images thereon obtained by the process steps described above. For purposes of illustration only, the different images are shown as being separated by the dotted lines 21 and 22 although as will be appreciated by those skilled in the art no such dotted line or other separating means is needed in actual practice. As is shown in FIG. 3, the beam 15 as recorded in the first or left-hand frame contains only one frequency component, recorded at region 25 in the image, whereas during the second or middle frame or image, the microwave beam 15 contains three frequency components being recorded at positions 20, 23, and 24 in the image and all being at a different frequency than the single frequency component at 25 in the first frame. In the third or right-hand frame, the beam 15 also contains only one frequency component being recorded at region 23, which will be noted as being at the same frequency as the central one of the frequency components in the second frame.

After each frame or spectral image of the beam 15 has been recorded in the tape 10, the continued movement of the tape 10 to the right brings this recorded image into the playback zone, located between the confronting openings provided in waveguides 16 and 17. The playback zone is disposed adjacent to the recording zone and the tape 10 is thus continuously disposed within the same static magnetic field 13 as during the recording step. Within the playback zone, each of the recorded images, in time sequence, is uniformly illuminated by a low intensity readout beam 18, containing all of the frequency components within the sensitive bandwidth of the recording tape, which beam 18 is directed through the upper playback waveguide 16 and over the surface of the complete frame or image on the tape to illuminate each frame or image passing through the playback zone.

As will be described in greater detail hereafter in this specification, each recorded image on the tape functions as a frequency selective filter and permits only those component frequencies from playback beam 18 corresponding to the frequencies previously recorded, to pass through the tape 10 and enter the opening in the detector waveguide 17 while absorbing all other frequency components in the playback beam 18 and preventing their passage through the tape. Consequently, the output radiant beam entering the detector waveguide 17 is substanially an idenical reproduction of the input beam 15, containing each and every frequency component therein.

As will be appreciated at this point in the specification, the process and system of the present invention responds directly to a radiant microwave beam at its input and produces a delayed radiant microwave beam at its output that is substantially identical to the input beam. The output beam may be amplified to enhance its amplitude or power content and then retransmitted or otherwise utilized as desired. According to the preferred process each different component frequency of the incoming beam is recorded at a different spatial position in the image thereby to produce a series of spectral frequency images of the beam along the length of the record. Due to the characteristics of the microwave sensitive material and the manner in which it is presensitized by the static magnetic field 13, each of the spectral images being formed functions as a microwave transparency or frequency filter enabling the original beam to be identically reproduced by illuminating the spectral image with a readout microwave beam containing a complete spectrum of the frequencies.

As is well known from Fourier's analysis and electromagnetic communication theory, an intelligence carrying microwave beam is basically comprised of a fundamental or carrier frequency component together with a series of harmonic frequency components thereof which may be taken together as information sidebands. Thus, by the practice of the present invention, the spectral image of the beam being recorded captures the complete intelligence of the beam and enables its delayed reproduction as desired. The process as described is relatively independent of the speed of moving the tape and variation in this speed merely varies the number of spectral images recorded within a given time interval.

As is described more fully in applicants' copending applications referred to above, the phenomena of microwave absorption and resonance is exhibited by a number of different materials, such as certain of the crystal materials and free radical materials, all of which possess free or uncoupled electrons or other subatomic particles therein that exist in orbiting or spin states and provide numerous subatomic magnetic dipoles in the material. The orientation and spin rates or energy condition of these dipole moments are controlled by the intensity of an external static magnetic field according to the Zeeman energy relationship to render such materials frequency sensitive. These numerous magnetic dipoles function in the manner of resonant circuits to absorb energy directly from a microwave beam at their resonant frequency and reradiate the energy at different wavelengths, such as in the form of heat. In a number of such materials, such as in the free radical materials, irradiated unsaturated hydrocarbon, and others mentioned in applicants' copending applications above, the heat being generated destroys the resonance condition of the material whereby if the material is later subjected to a radiant microwave beam at the same frequency, the material is effectively transparent to the beam and the beam may pass through without absorption. According to the present invention, a resonant material of this type is dispersed over or embedded in an extended surface region of the tape 10, and is subjected to a nonuniform static magnetic field 13 to render different positions across the record member selective to different frequency components of the beam. During the recording steps, the incoming radiant beam 15 is of sufficient intensity to destroy the resonance conditions at the different positions across the tape corresponding to the different frequency components in the beam 13 thereby to record a frequency spectrum as desired. At those regions where the resonance condition is destroyed, the tape 10 is thereafter rendered transparent to that frequency whereby during playback or reproduction of the beam, that component of frequency from the spectrum playback beam 18 may pass through the tape 10 whereas other components of playback beam 18 are absorbed by the tape and cannot pass through to the detector waveguide 17. During the playback interval, the intensity of the playback beam 18 is reduced to an amplitude level that is not sufficient to destroy the resonance condition of the previously unaffected material on the tape whereby the recorded information on the tape may be reproduced over and over again if desired.

According to the invention, the time interval between recording of beam 15 and playback of its reproduction is controlled by the distance or spacing between the recording and playback waveguides as shown in FIG. 1 and the speed of moving the tape between these waveguide openings. Consequently, in the arrangement of FIGS. 1 and 2, the time delay between reception of the beam and reproduction of the beam may be varied by either changing the distance between the recording waveguide 14 and playback speed of the tape 10.

Figures 4, 5, 6:
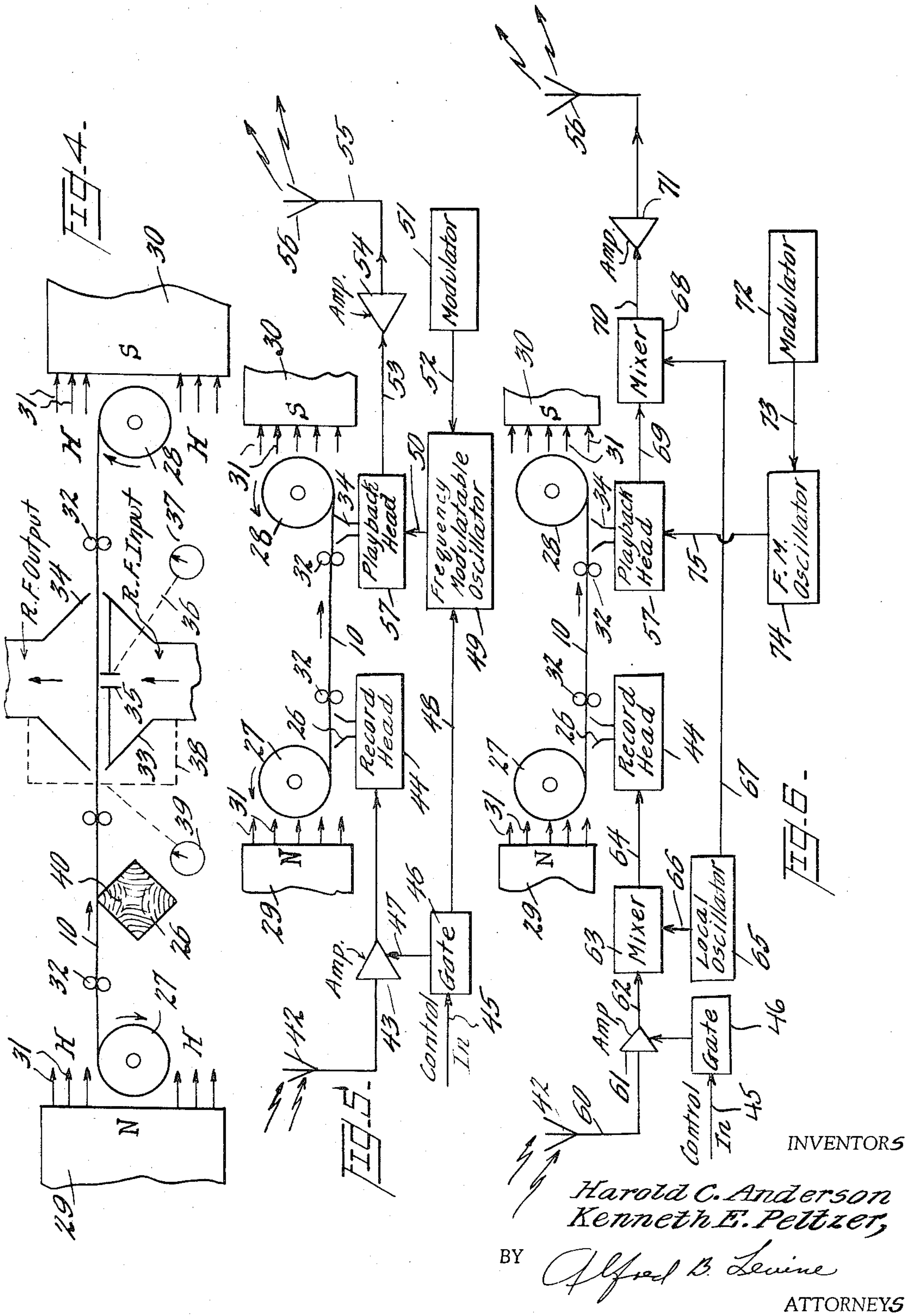
FIG. 4 is a schematic diagram illustrating a system for recording and reproducing radiant microwave beams with variable time delay according to the present invention.
FIG. 5 is a schematic diagram similar to FIG. 4 and illustrating time control means for the recording and playback of the radiant beam.
FIG. 6 is a schematic illustration of a recording system, similar to FIG. 5, for recording and reproducing radiant beams at lower radio frequencies according to the invention.

FIG. 4 schematically illustrates a system for the direct storage and playback of microwave beams including means for adjusting both the time delay before playback and the relative duration of playback of the beam.

As shown in FIG. 4, the tape 10 may be in the form of an elongated web wound about a storage spool 27 and guided by means of a series of capstans 32 for continuous movement through the recording and playback zone for rewinding onto a drive spool 28. During its passage through the recording and playback zones, the tape is continuously subjected to a nonuniform magnetic field 31 supplied by permanent magnet poles 29 and 30, as shown, which may be tapered as in FIG. 2 to provide the necessary nonuniform magnetic flux across the tape 10 as required.

Within the recording zone, the incoming radiant beam 40 is conveyed through a waveguide 26 in the proper mode and applied uniformly across the tape in a narrow line image through an elongated slot formed in one edge of the waveguide 26, as shown, thereby to record a series of narrow images. Continued movement of the tape 10 to the right brings the images successively into the playback zone where a low intensity playback beam 18 containing a complete spectrum of frequencies is introduced through a funnel-shaped waveguide 33 underneath the tape 10 and through an aperture 35 formed therein to illuminate the underside of the thin tape in a narrow line transversely across the tape. As discussed above, the tape 10 is effectively transparent to the passage of frequency components that have been previously recorded permitting their passage into the funnel-shaped detector waveguide head 34 but absorbing the remaining frequency components, thereby to play back the original beam after a delayed interval.

The time delay between recording and playback is determined by the distance between the edge slot in waveguide 40 and the aperture 35 in playback waveguide 33, assuming a constant speed drive of the tape 10. For adjusting this time delay as desired, the playback waveguides 33 and 34 may be mechanically coupled together as indicated by the dotted line 38, and may be together movable toward and away from the recording waveguide 26 in a direction along the axis of the tape 10, as indicated by the adjusting knob 39. This adjustment thus varies the time interval between recording and reproduction of the radiant beam 40.

Assuming that the incoming radiant beam 40 is in the form of discrete time spaced impulses, as in the radar applications mentioned, the recorded images are in the form of a series of separate images along the length of the tape each having length and width dimensions corresponding to the dimensions of the slot provided in the recording waveguide 26. For playing back these impulses over either a longer or shorter time duration than during the recording thereof, the aperture 35 formed in the playback waveguide 33 may be made adjustable and either increased or decreased in width as generally indicated by the dotted line 36 and the adjustment knob 37. Increasing the width of this aperture 35 over that of the slot 40 in the recording waveguide 26 enables the recorded image to be illuminated by the playback spectrum beam for a longer time duration than during its recording and consequently, reproduces the identical beam over a longer time duration than during its original recording. Additionally, as is believed evident, a series of playback mechanisms may be provided to repetitively reproduce the incoming beam as a series of output pulse beams occurring simultaneously or in time sequence, as desired, and with the different playback beams being produced with the same or different time durations.

FIG. 5 illustrates a variation of the system of FIG. 4 permitting time sampling of the incoming radiant beam and its controlled reproduction responsively to an electrical control signal over line 45. As shown, the incoming radiant beam is received by a suitable antenna 42 and directed through a controlled amplifier 43 before being conveyed to the recording head 44 for application to the microwave recording tape. The amplifier is controlled on and off by a suitable gate circuit 46 in response to a control signal over line 45 thereby enabling control of the time of applying the radiant beam to the tape for recording. In the playback zone, the playback head waveguide 57 is energized by a frequency spectrum generator comprised of a frequency modulatable oscillator 49 controlled by a modulator 51 thereby to produce a complete spectrum of frequency signals into the playback waveguide 57 as desired. The oscillator 49 is also controlled on and off by the gate circuit 46 for initiating and terminating the playback function. According to one preferred sequence of controlled operation, the gate circuit 46 is programmed to perform three functions in response to a sequence of three control impulses over line 45. In response to the first impulse, the gate provides an enabling signal over line 47 and a disabling signal over line 48. The former operates the amplifier 43 to enable the recording of the incoming beam, and the latter disables the playback unit from functioning during this recording interval. At the termination of the recording interval, a second control impulse to the gate 46 disables both the recording and playback during a time delay interval after which a third control impulse is directed to the gate 46. The third disables the recording amplifier 43 but actuates the oscillator 49 thereby to maintain the recording function disabled during reproduction or playback of the previously recorded signal.

As generally discussed above, the subatomic resonant recording materials employed on the tape 10 according to the present invention are frequency sensitive materials that may be made responsive to radiant beams in the microwave radio frequency bandwidths. These materials function most satisfactorily according to the present state of the art at frequencies in excess of about 1000 megacycles. FIG. 6 illustrates a further modification of the invention permitting radiant beams at frequencies below the resonant bandwidth of the microwave recording tape 10 to be recorded and reproduced. As shown, the incoming radiant beam is first received by a suitable antenna 42 and then amplified by a preamplifier 61 before being introduced into a mixer 63 where this beam is beat with a signal from a local oscillator 65 to produce sum and difference frequency components of the incoming beam and the oscillator signal. During the recording step, the sum component is selected and adjusted by means of the local oscillator 65 to lie within the resonant bandwidth of the microwave sensitive tape 10. The beam being recorded on the tape, therefore, is at a much higher frequency than the incoming radio beam and includes the frequency of the local oscillator 65. During delayed playback of this recorded signal, the playback beam is also fed to a mixer 68 from the playback waveguide 57 where it is beat with the same frequency signal over line 67 from the local oscillator 65. However, in the playback mixer 68 the difference beat frequency component is employed at the output 70 thereof instead of the sum frequency component as during the recording step. Consequently, during the playback operation, the local oscillator signal is removed from the outgoing beam leaving, as a result, the original lower frequency radio beam which it is desired to reproduce. As before, the resulting radio beam output being transmitted from antenna 56 is substantially an identical reproduction of the incoming beam at the same or at a different amplitude or power level as desired. As is believed now evident, the local oscillator signal need not be precisely known since it is equally added during recording and then substracted during playback, and it is only necessary that it be maintained at a constant frequency over the complete interval of recording and playback, and that it be produced at a sufficient frequency that when added to the incoming radio beam a sum component be produced that lies within the frequency bandwidth of the microwave recording tape.

It is believed evident that many variations and modifications may be made by those skilled in the art without departing from the spirit and scope of this invention. Accordingly, this invention should be considered as limited only according to the following claims.

What is claimed is:

1. A process for directly recording and reproducing a radiant radio beam at microwave frequencies comprising the steps of: intermittently directing the beam to uniformly illuminate different extended surface regions of a microwave absorptive material, simultaneously subjecting the illuminated regions to a nonuniform static magnetic field to render different positions in said region selectively responsive to different frequencies of the radiant beam thereby to record separate images of the beam with each image having a spectral distribution of different frequency components of the beam and reproducing each of the images during the time intervals between the intermittent recording thereof.

2. In the process of claim 1, the steps of reproducing the images comprising: illuminating the image by a low intensity readout radiant beam containing a spectrum of frequencies, simultaneously subjecting the illuminated image during readout to a nonuniform static magnetic field of the same distribution and intensity as during the recording steps, and detecting those frequency components of the readout beam that are not absorbed by the material.

3. In the process of claim 1, the additional steps of recording and reproducing a radiant radio beam within a lower frequency bandwidth than the bandwidth of the microwave absorptive material comprising beat frequency mixing said radio beam with a reference beam of sufficiently high frequency that the sum sideband thereof lies within the microwave frequency bandwidth of the microwave absorptive material and intermittently directing said sum component beam to illuminate the material and form said images, and reproducing the radio beam from said images by reproducing the sum component beam from the image and beat frequency mixing said sum component beam with said reference beam to obtain the difference component thereof.

4. A microwave to microwave memory and playback system for radiant radio beam impulses having variable time delay between memory and playback and variable time duration of playback comprising: means for recording each radiant impulse as a dispersed frequency spectrum image on a moving record member, means for reproducing each of said images as radiant radio beam impulses by scanning said moving record member with a readback radiant beam, means for varying the time delay between recording and reproduction by varying the distance along said record between said recording means and reproduction means, and means for varying the time duration of reproducing said radio beam by varying the duration of scanning said member by said readback beam.

5. In the system of claim 4, said reproducing means including a mechanism providing a variable aperture for directing said playback beam on said moving record and means for enabling adjustment of said aperture to vary the time duration that a given position on said moving record is scanned by said playback beam.

6. In a system for recording and delayed reproduction of radiant microwave beams on a microwave sensitive record member, means for receiving said beam and intermittently applying the beam to illuminate said record member responsively to a control signal, means for energizing said record member with a nonuniform static magnetic field to selectively render different portions of said record sensitive to different frequencies of the beam in a spectral frequency distribution pattern, and means responsive to a second control signal for intermittently reproducing said beam from the spectral pattern during the time intervals between the intermittent application of the beam to the member, means associated with said applying means and reproducing means for enabling the recording and reproduction of lower frequency radiant radio beams having a bandwidth below the sensitive bandwidth of the microwave sensitive record member, said associated means comprising a beat frequency mixer in said applying means and a beat frequency mixer in said reproducing means, both mixers being energizable by a reference frequency signal having a sufficiently high frequency when added to the frequency of the radio beam to fall within the microwave bandwidth of the record member, said mixer in the applying means providing a sum frequency sideband beam for application to said record, and said mixer in the reproduction means being energized by said sum frequency sideband beam and producing a difference frequency sideband component.

7. A spin resonant system for recording and reproducing radio beams comprising a frequency sensitive record member, means for directing a time variable radio beam to different displaced positions of said frequency sensitive record member to record a plurality of spectral frequency images of said time variable beam, means for reproducing each of said images into a substantially identical time variable radio beam, means for varying the time interval between recording and reproduction of each of said images, said means for varying the time interval comprising means for movably positioning said record member in time sequence with respect to said recording means to receive and record each said image and then movably positioning said record with respect to said reproducing means to reproduce said image as a beam, and including means for varying the time interval of movably positioning said member between said recording and reproducing means.

8. In the system of claim 7, the additional means comprising means for applying said beam to the record for a different time interval than the time interval for reproducing the beam.

9. A method of recording a time variable signal as a frequency spectrum image thereof and reproducing the original time variable signal from said spectral image for an adjustable time interval that is selectively the same as or different from the recording interval comprising the steps of: recording a frequency spectrum image of the signal over a given spatial region of a recording member, and reproducing the original signal by energizing the recorded spectral image by a playback signal for a preselected time interval, the step of recording the signal being performed by moving an elongated recording medium with respect to the signal being applied thereto, thereby to record a series of such spectral images of the time variable signal, and the step of reproducing said images for a selectively same or different time interval being performed by moving the record member with respect to a playback signal at the same speed as the movement during recording but applying the playback signal to an adjustably different spatial region of the recording medium.

10. A process for receiving radar radio signals of unknown frequency, processing said signals, and reproducing said signals for retransmission back to the sending source comprising the steps of: directly recording the radio signals as a consecutive series of frequency spectrum images displaced from one another on different areas of spin resonant frequency sensitive record material, with each image containing a recording of the different spectral frequency components of the radio signal displaced from one another in the image, said recording step being performed by providing relative movement of the different areas with respect to the radio signal, directly reproducing said series of frequency spectrum images by successively illuminating said different areas by providing relative movement between said areas and a playback radio signal containing a band of frequencies including the frequency components of the recorded radio signals, and providing an adjustable time delay between the recording of said images and the reproducing of said image by adjustably physically changing the distance between said recording of the signal on the areas and the reproducing of the signals from the areas.

11. In the process of claim 10, the additional step of varying the time duration of reproducing each of the images with respect to the time of recording each of said images by adjustably focusing the playback radio signal to illuminate a different proportion of said images.

12. In the process of claim 10, the recording and reproducing of the series of images being performed by providing said different areas of spin resonant material at different displaced positions along an elongated record member and moving said record member past the radio signal to be recorded and past the playback radio signal, with the playback radio signal being adjustably physically displaced from said radio signal to be recorded to reproduce the image after an adjustable time delay.

13. In the process of claim 10, the additional step of intermittently recording and reproducing said radar signal by alternately applying said radar signal and playback signal to said areas.

14. A process for recording an image of an electromagnetic signal on a spin resonant material where the frequency of the signal differs from the frequency sensitive bandwidth of the material comprising the steps of: applying a low frequency magnetic field to the spin resonant material according to the Zeeman energy relationship, mixing said signal with a reference signal to derive a sideband frequency signal within the bandwidth of the material, and applying said beat frequency signal to the material to obtain an image thereof.

15. In the process of claim 14, the additional step of reproducing said electromagnetic signal comprising illuminating said material with a playback signal to reproduce the recorded beat frequency signal, mixing said reproduced signal with the same reference signal to obtain additional sideband frequency signals, and selecting that one of the additional sideband signals corresponding to the electromagnetic signal.

References Cited

UNITED STATES PATENTS

| | | | |
|---|---|---|---|
| 3,137,003 | 6/1964 | Anderson et al. | 340—173 |
| 3,155,941 | 11/1964 | Mims | 340—173 |
| 3,238,511 | 3/1966 | Anderson et al. | 340—173 |

BERNARD KONICK, *Primary Examiner.*

JAMES W. MOFFITT, *Examiner.*

J. BREIMAYER, *Assistant Examiner.*